United States Patent
Huang et al.

(10) Patent No.: US 10,026,104 B2
(45) Date of Patent: Jul. 17, 2018

(54) METHOD AND SYSTEM FOR AUTOMATICALLY PAUSING ADVERTISEMENTS BASED ON USER ATTENTION

(71) Applicant: Excalibur IP, LLC, New York, NY (US)

(72) Inventors: Ling-Wei Huang, New Taipei (TW); Wei-Han Li, New Taipei (TW); Huai-Hsing Huang, Taipei (TW); Chia-Yen Liu, Keelung (TW); Chi-Wa Ng, Macau (CN); Shih-ting Huang, Taipei (TW); Shih-Ping Lu, New Taipei (TW); Dai-Yan Chen, New Taipei (TW); Pin-Kuan Lee, Taipei (TW)

(73) Assignee: EXCALIBUR IP, LLC, New York, NY (US)

( * ) Notice: Subject to any disclaimer, the term of this patent is extended or adjusted under 35 U.S.C. 154(b) by 396 days.

(21) Appl. No.: 14/942,608

(22) Filed: Nov. 16, 2015

(65) Prior Publication Data
US 2016/0071166 A1 Mar. 10, 2016

Related U.S. Application Data

(63) Continuation of application No. 13/920,212, filed on Jun. 18, 2013, now Pat. No. 9,189,805.

(51) Int. Cl.
*G06Q 30/00* (2012.01)
*G06Q 30/02* (2012.01)
(Continued)

(52) U.S. Cl.
CPC ..... *G06Q 30/0272* (2013.01); *G06Q 30/0277* (2013.01); *H04N 21/4782* (2013.01); *H04N 21/6587* (2013.01); *H04N 21/812* (2013.01)

(58) Field of Classification Search
CPC .................................. G06Q 30/0207–30/0277
(Continued)

(56) References Cited

U.S. PATENT DOCUMENTS

| 6,757,691 | B1 * | 6/2004 | Welsh | G06Q 30/02 |
| 2002/0092019 | A1 * | 7/2002 | Marcus | G11B 27/034 725/37 |

(Continued)

*Primary Examiner* — Matthew T Sittner
(74) *Attorney, Agent, or Firm* — Brinks Gilson & Lione

(57) ABSTRACT

A computer-implemented method for automatically pausing advertisements based on user attention includes rendering a digital video to a user, in response to the user initiating the digital video through a web multimedia player. The computer-implemented method also includes streaming an advertisement to the user once the user begins to watch the digital video and monitoring the user attention as the user watches the advertisement. The user attention is monitored based on keystrokes and mouse movements. Further, the computer-implemented method includes detecting one or more changes in the user attention. Furthermore, the computer-implemented method includes pausing the advertisement automatically at instance of detecting the one or more changes. Moreover, the computer-implemented method includes detecting the one or more changes that directs the user attention to the paused advertisement and resuming streaming of the advertisement.

17 Claims, 6 Drawing Sheets

(51) Int. Cl.
  *H04N 21/4782* (2011.01)
  *H04N 21/6587* (2011.01)
  *H04N 21/81* (2011.01)

(58) Field of Classification Search
  USPC ........................................................ 705/319
  See application file for complete search history.

(56) References Cited

U.S. PATENT DOCUMENTS

| | | | | |
|---|---|---|---|---|
| 2002/0095357 A1* | 7/2002 | Hunter | ............... | G06Q 10/0637 705/7.36 |
| 2002/0169670 A1* | 11/2002 | Barsade | ................. | G06Q 30/02 705/14.47 |
| 2004/0267611 A1* | 12/2004 | Hoerenz | ............ | G06Q 10/0637 705/14.13 |
| 2006/0015904 A1* | 1/2006 | Marcus | ................ | G11B 27/034 725/46 |
| 2006/0122877 A1* | 6/2006 | Yazdani | ................. | G06Q 10/06 705/28 |
| 2006/0200415 A1* | 9/2006 | Lu | ............................ | G06F 21/10 705/50 |
| 2006/0248013 A1* | 11/2006 | Ebert | ..................... | G06Q 30/02 705/51 |
| 2007/0038513 A1* | 2/2007 | Flax | ....................... | G06Q 30/00 705/14.44 |
| 2008/0140481 A1* | 6/2008 | Gold | ....................... | G06Q 30/02 705/7.29 |
| 2008/0232561 A1* | 9/2008 | Hildreth | ................. | G06Q 30/02 379/88.22 |
| 2008/0249867 A1* | 10/2008 | Angell | .................... | G06Q 30/02 705/14.26 |
| 2008/0266156 A1* | 10/2008 | Bruin | ..................... | H03M 3/504 341/146 |
| 2008/0281689 A1* | 11/2008 | Blinnikka | ................. | G06Q 30/02 705/14.61 |
| 2008/0307454 A1* | 12/2008 | Ahanger | .................... | G06Q 30/02 725/36 |
| 2009/0030774 A1* | 1/2009 | Rothschild | ............. | G06Q 30/02 705/14.1 |
| 2009/0123025 A1* | 5/2009 | Deng | ................. | G06K 9/00711 382/100 |
| 2009/0144328 A1* | 6/2009 | Martinez | ............ | G06Q 30/0603 |
| 2009/0144769 A1* | 6/2009 | Liebhold | .................. | H04N 5/76 725/39 |
| 2009/0192897 A1* | 7/2009 | Dintenfass | ............. | G06Q 30/02 705/14.26 |
| 2009/0235312 A1* | 9/2009 | Morad | ................... | G06Q 30/02 725/44 |
| 2009/0271283 A1* | 10/2009 | Fosnacht | ............. | G06Q 20/123 705/26.1 |
| 2010/0010890 A1* | 1/2010 | Ditkovski | .............. | G06Q 30/02 705/14.41 |
| 2010/0057560 A1* | 3/2010 | Skudlark | ............... | G06Q 30/02 705/14.49 |
| 2010/0058220 A1* | 3/2010 | Carpenter | ............... | G06Q 30/02 715/772 |
| 2010/0287580 A1* | 11/2010 | Harding | ............ | G06Q 30/0247 725/14 |
| 2010/0293059 A1* | 11/2010 | Davison | ................. | G06Q 30/02 705/14.69 |
| 2011/0022964 A1* | 1/2011 | Toebes | .................... | H04L 67/22 715/747 |
| 2011/0106630 A1* | 5/2011 | Hegeman | ............. | G06Q 30/02 705/14.71 |
| 2011/0107431 A1* | 5/2011 | Sukanen | ............... | G06F 21/42 726/27 |
| 2011/0197237 A1* | 8/2011 | Turner | ............... | H04N 21/2343 725/78 |
| 2011/0217022 A1* | 9/2011 | Miller | .................... | G06Q 30/02 386/278 |
| 2011/0252050 A1* | 10/2011 | Palleti | ............... | G06F 17/30876 707/769 |
| 2011/0282745 A1* | 11/2011 | Meoded | ............ | G06Q 30/0264 705/14.61 |
| 2011/0296293 A1* | 12/2011 | Bhadury | ........... | G06F 17/30905 715/234 |
| 2013/0006758 A1* | 1/2013 | Hegeman | ........... | G06Q 30/0251 705/14.46 |
| 2013/0091001 A1* | 4/2013 | Jia | ....................... | G06Q 30/0224 705/14.25 |
| 2013/0144720 A1* | 6/2013 | Hari | ................... | G06Q 30/0241 705/14.55 |
| 2013/0144968 A1* | 6/2013 | Berger | .................... | H04L 67/32 709/217 |
| 2013/0300759 A1* | 11/2013 | White | ..................... | G06F 3/011 345/589 |
| 2013/0347029 A1* | 12/2013 | Tang | ................. | G06F 17/30029 725/32 |
| 2014/0098116 A1* | 4/2014 | Baldwin | ................ | G06F 3/011 345/522 |
| 2014/0123181 A1* | 5/2014 | Wang | .................. | H04N 21/2665 725/37 |
| 2014/0372229 A1* | 12/2014 | Huang | ................. | G06Q 30/02 705/14.68 |
| 2016/0071166 A1* | 3/2016 | Huang | ................ | G06Q 30/0272 705/14.68 |

* cited by examiner

METHOD AND SYSTEM FOR AUTOMATICALLY PAUSING ADVERTISEMENTS BASED ON USER ATTENTION

CROSS-REFERENCE TO RELATED APPLICATIONS

This application is a continuation application of U.S. Non-Provisional application Ser. No. 13/920,212 (now U.S. Pat. No. 9,189,805), filed Jun. 18, 2013. The contents of U.S. Non-Provisional application Ser. No. 13/920,212 (now U.S. Pat. No. 9,189,805) are incorporated by reference in their entirety.

TECHNICAL FIELD

Embodiments of the disclosure relate generally, to browser based applications and more specifically, to automatically pause advertisements based on user attention.

BACKGROUND

Browsing activities continue to widespread among thousands of users who cultivate the web as an essential tool to access information and web applications. Web applications are accessed by users over a network such as Internet or Intranet. Common web applications include webmail, multimedia content, online retail sales, online auctions, wikis and many such kinds.

In scenarios where the users accesses multimedia content for example, web videos, appropriate videos are rendered to the users. Occasionally, advertisements are also rendered to the users. In such circumstances, a normal tendency of the users while watching advertisements is to divert ones attention towards other web applications. Additionally, other possibilities arise when the users get up and engage themselves in other activities such as cooking, door bells and phone calls. Consequently, the user may leave a current web page where the advertisements are played. As a result, the user may miss the advertisements being played. The user will need to replay the advertisement once again from the beginning. This process is time consuming as the user would have previously watched a specific part of the advertisement and becomes unexciting. Moreover, the process becomes cumbersome.

In light of the foregoing discussion, there is a need for an efficient method and system for automatically pausing advertisements based on user attention.

SUMMARY

The above-mentioned needs are met by a computer-implemented method, computer program product, and system for automatically pausing advertisements based on user attention.

An example of a computer-implemented method for automatically pausing advertisements based on user attention includes rendering a digital video to a user, in response to the user initiating the digital video through a web multimedia player. The computer-implemented method also includes streaming an advertisement to the user once the user begins to watch the digital video and monitoring the user attention as the user watches the advertisement. The user attention is monitored based on keystrokes and mouse movements. Further, the computer-implemented method includes detecting one or more changes in the user attention. Furthermore, the computer-implemented method includes pausing the advertisement automatically at instance of detecting the one or more changes. Moreover, the computer-implemented method includes detecting the one or more changes that directs the user attention to the paused advertisement and resuming streaming of the advertisement.

An example of a computer program product stored on a non-transitory computer-readable medium that when executed by a processor, performs a method for automatically pausing advertisements based on user attention includes rendering a digital video to a user, in response to the user initiating the digital video through a web multimedia player. The computer program product includes streaming an advertisement to the user once the user begins to watch the digital video and monitoring the user attention as the user watches the advertisement. The user attention is monitored based on keystrokes and mouse movements. Further, the computer program product also includes detecting one or more changes in the attention of the user. Further, the computer program pausing the advertisement automatically at the point of detecting the one or more changes. Moreover, the computer program product includes detecting the one or more changes that directs the attention of the user to the paused advertisement and resuming streaming of the advertisement.

An example of a system for automatically pausing advertisements based on user attention includes a computing device. The system also includes a web browser loads a plurality of web pages to the user. Further, the system includes a web multimedia player that renders a digital video to the user. Furthermore, the system includes an advertisement server that streams advertisements on the web pages. Moreover, the computer program product includes a detecting module to detect one or more changes in the attention of the user.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

A computer-implemented method, computer program product, and system for automatically pausing advertisements based on user attention are disclosed. The following detailed description is intended to provide example implementations to one of ordinary skill in the art, and is not intended to limit the invention to the explicit disclosure, as one of ordinary skill in the art will understand that variations can be substituted that are within the scope of the invention as described.

Figure 1:
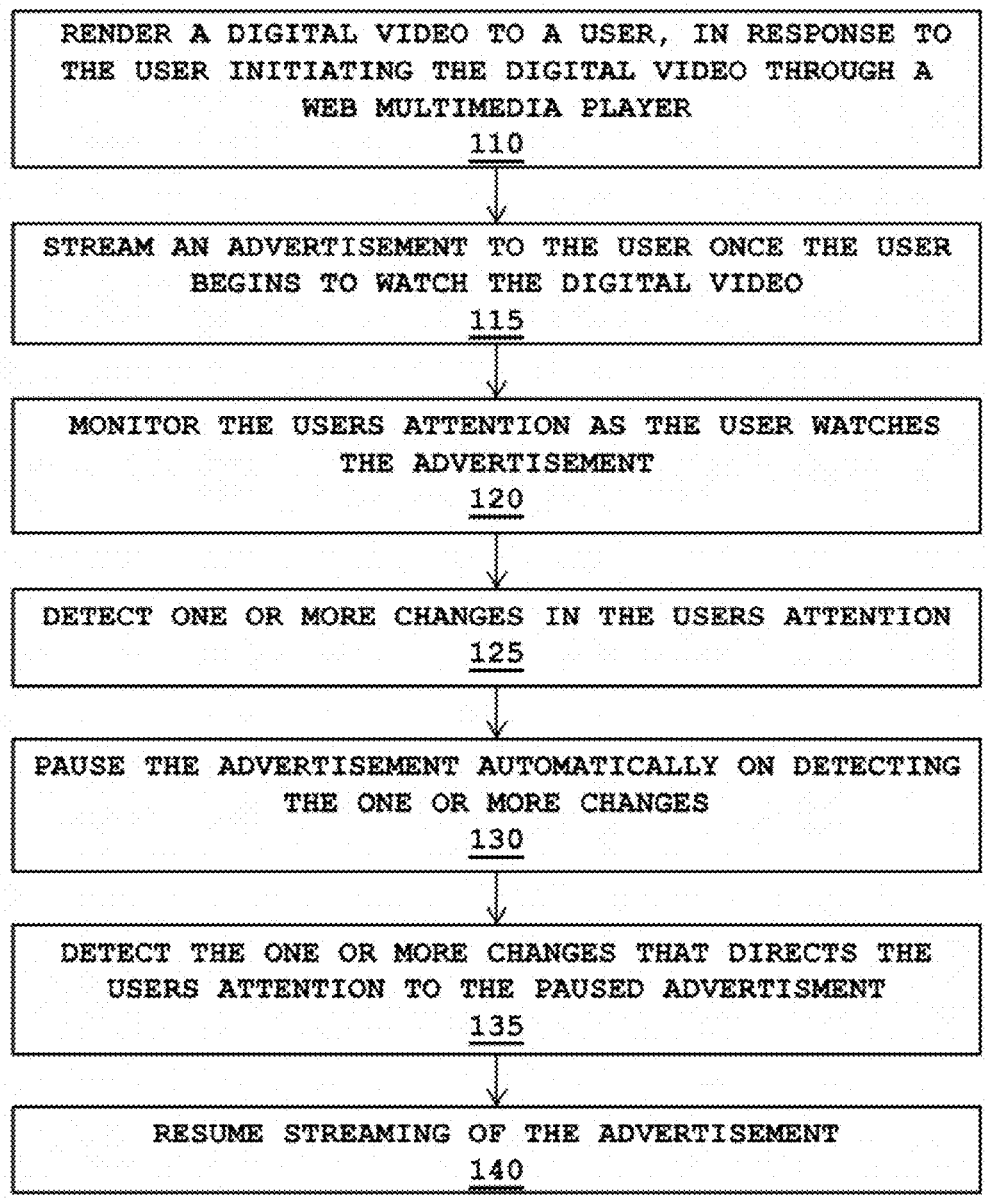
FIG. 1 is a flow diagram illustrating a method for automatically pausing advertisements based on user attention, in accordance with one embodiment.

FIG. 1 is a flow diagram illustrating a method for automatically pausing advertisements based on user attention, in accordance with one embodiment.

At step 110, a digital video is rendered to a user, in response to the user initiating the digital video through a web multimedia player.

Occasionally, the user wishes to access multimedia content such as a digital video on a web page. Consequently, the user enters an appropriate Uniform Resource Locator (URL) in a web browser. The web browser can be a desktop web browser (for example, Internet Explorer, Mozilla, or Chrome), a mobile browser, or a web viewer built into an application program. The webpage can include textual information, digital images, videos, video and static advertisements, and other digital assets. Further, the digital video is rendered through a web multimedia player, such as YouTube and Yahoo video.

The digital video is rendered to the user on a first browser tab.

At step 115, an advertisement is streamed to the user once the user begins to watch the digital video.

Typically, advertisements are displayed while the user watches the digital video. The advertisements include multiple moving pictures and text related to a specific product, for example, cars, electronic gadgets, resorts and so on.

As the web page is loaded, the web browser gets connected to an advertisement server. The advertisement server generally stores advertisements that are to be delivered to the user.

At step 120, the user attention is monitored based on keystrokes and mouse movements, as the user watches the advertisement.

A normal tendency of the user browsing the web is to keep changing attention between various applications and features found on the web page. In some scenarios, the user may want to open another application in an alternative browser tab. To be acquainted with the attention of the user is vital and consequently the attention of the user is monitored.

At step 125, one or more changes are detected in the attention of the user.

The one or more changes results when the user switches attention due to a plurality of factors. The factors include attention to another application and attention to a second browser tab. In some embodiments, the changes can be detected by user movements such as mouse movements and keystrokes.

In the scenario when the user opens the second browser tab, a picture of the paused advertisement is captured. In some embodiments, the picture can be snapshot of the advertisement that was streamed.

Subsequently, the picture captured is displayed on the web page on the second browser tab. In one embodiment, the picture is displayed towards a corner of the web page. Consequently, the user is attentive about the advertisement played earlier.

At step 130, the advertisement is paused automatically on detecting the one or more changes.

At the instance when the changes are detected, the advertisement played originally is automatically paused.

At step 135, the one or more changes that directs the user attention to the paused advertisement is detected.

The changes are constantly detected. One of the changes directs the user attention to the advertisement that was initially played to the user.

At step 140, the advertisement resumes to be streamed.

The paused advertisement continues to be streamed to the user. As a result, the user does not miss the advertisement when drifted attention.

Figure 2A:
FIG. 2a, FIG. 2b and FIG. 2c are exemplary representations of the method, in accordance with one embodiment.
Figure 2B:
Figure 2C:

FIG. 2a, FIG. 2b and FIG. 2c are exemplary representations of the method, in accordance with one embodiment.

FIG. 2a represents an exemplary representation of a user watching an advertisement 210 on a web page displayed on a first browser tab 215.

Consider a scenario when a user desires to browse Internet and opens a web page on a first browser tab 215. The web page includes text, images and the advertisement 210. The advertisement 210 begins to play when the web page is loaded.

FIG. 2b represents an exemplary representation of the user changing attention from the advertisement 210 and opening a different web page on a second browser tab 220. The change in the attention of the user is detected and consequently the advertisement 210 is paused. Subsequently, the user gets engaged with other applications on the web page now displayed on the second browser tab 220.

The advertisement 210 is captured and displayed on the web page displayed in the second browser tab 220. In some embodiments, the advertisement 210 is displayed in a corner of the web page. As a result, the user is now conscious that the advertisement 210 has been paused and can continue playing the advertisement 210 if wished for.

FIG. 2c is an exemplary representation of the user changing attention back to the first browser tab 215. Consequently, the advertisement 210 resumes and is played to the user. Accordingly, the user does not miss on the advertisement 210 that was originally being played.

Figure 3:
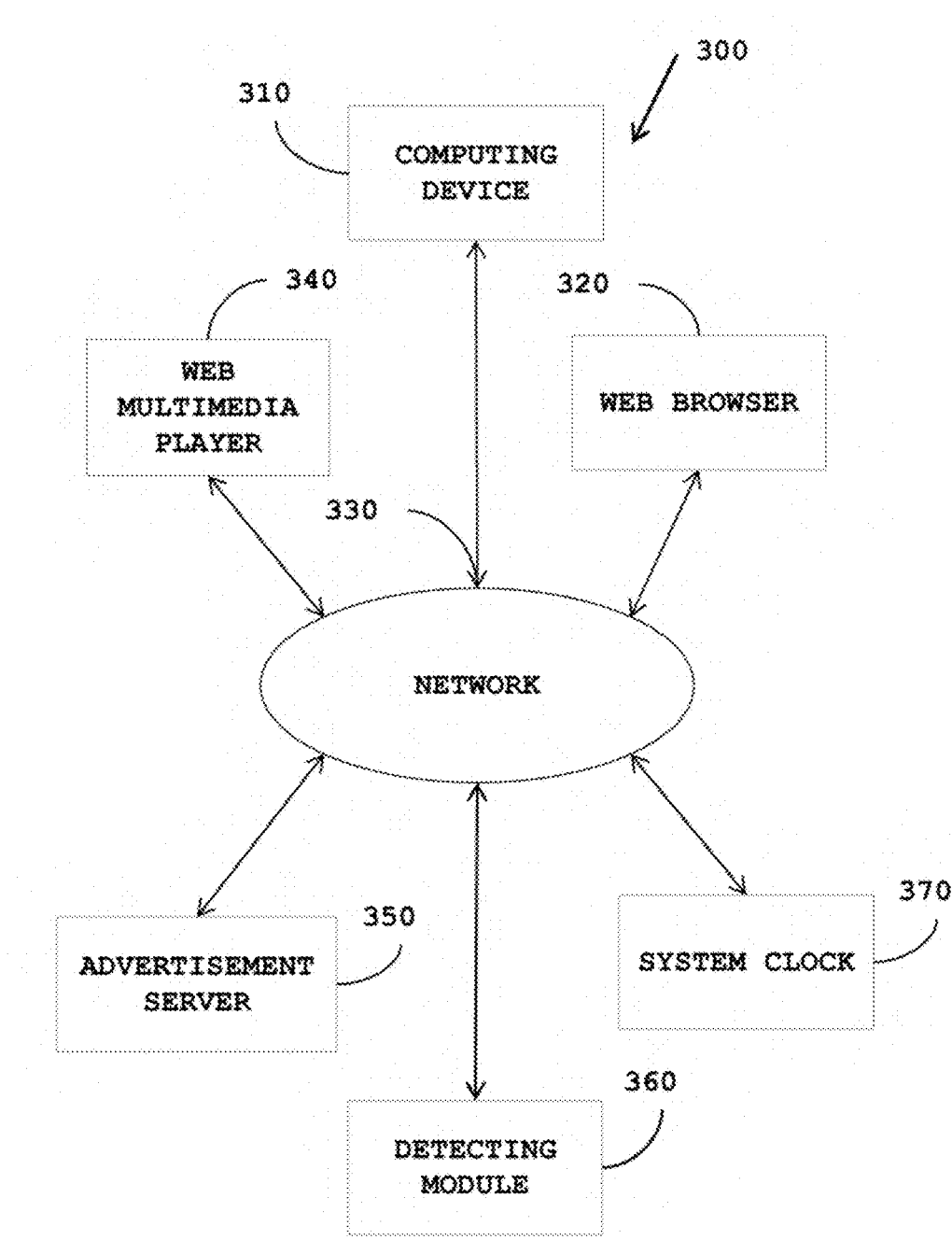
FIG. 3 is a block diagram illustrating a system for automatically pausing advertisements based on user attention, in accordance with one embodiment.

FIG. 3 is a block diagram illustrating a system for automatically pausing advertisements based on attention of the user, in accordance with one embodiment.

The system 300 can implement the method described above. The system 300 includes a computing device 310, a web browser 320, a web multimedia player 340, an advertisement server 350, a detecting module 360 and a system clock 370 in communication with a network 330 (for example, the Internet or a cellular network).

Examples of the computing device 310 include, but are not limited to, a Personal Computer (PC), a laptop or notebook computer, a tablet computer, a smart phone or Personal Digital Assistant (PDA), a smart appliance, an Internet television or any other suitable processor-based device that can display advertisements.

The computing device 310 includes a web browser 320. The web browser can be a desktop web browser (for example, Internet Explorer, Mozilla, or Chrome), a mobile browser, or a web viewer built integrated into an application program.

The web browser 220 loads web pages desired by the user. The web pages can include textual information, digital images, video and static advertisements, and other digital assets.

The web multimedia player 340 renders digital videos and advertisements to the user of the computing device 310. In some embodiments, the receiving module 240 can be a component of the computing device 210.

The advertisement server 350 selects advertisements that are displayed on the web page. The selected advertisements are rendered to the user.

The detecting module 360 constantly monitors the attention of the user on the web page. Moreover, the changes in attention of the user are detected by the detecting module 360.

The system clock 370 constantly tracks a current time of play during the rendering of advertisements and digital videos on the web page.

The user of the computing device 310 desires to view a digital video through the web browser 320. A web page is correspondingly displayed to the user in a first browser tab. Digital videos are rendered to the user by the web multimedia player 340. Consequently, an advertisement is also rendered to the user by the advertisement server 350. The user views the advertisement. However, the user changes attention towards another application by opening a second browser tab. At this point, the advertisement is paused and the time of pausing is tracked by the system clock 370. A picture of the advertisement paused is captured and displayed to the user on the web page in the second browser tab. Subsequent changes in the attention of the user are monitored and detected by the detecting module 360. As the change is detected such that the attention of the user is drawn back to the advertisement paused, the advertisement resumes to be streamed to the user. The system clock 370 facilitates to resume playing the advertisement form the time of pausing. Consequently, the user does not overlook on the advertisement when changing attention to another application.

Additional embodiments of the computing device 310 are described in detail in conjunction with FIG. 3.

Figure 4:
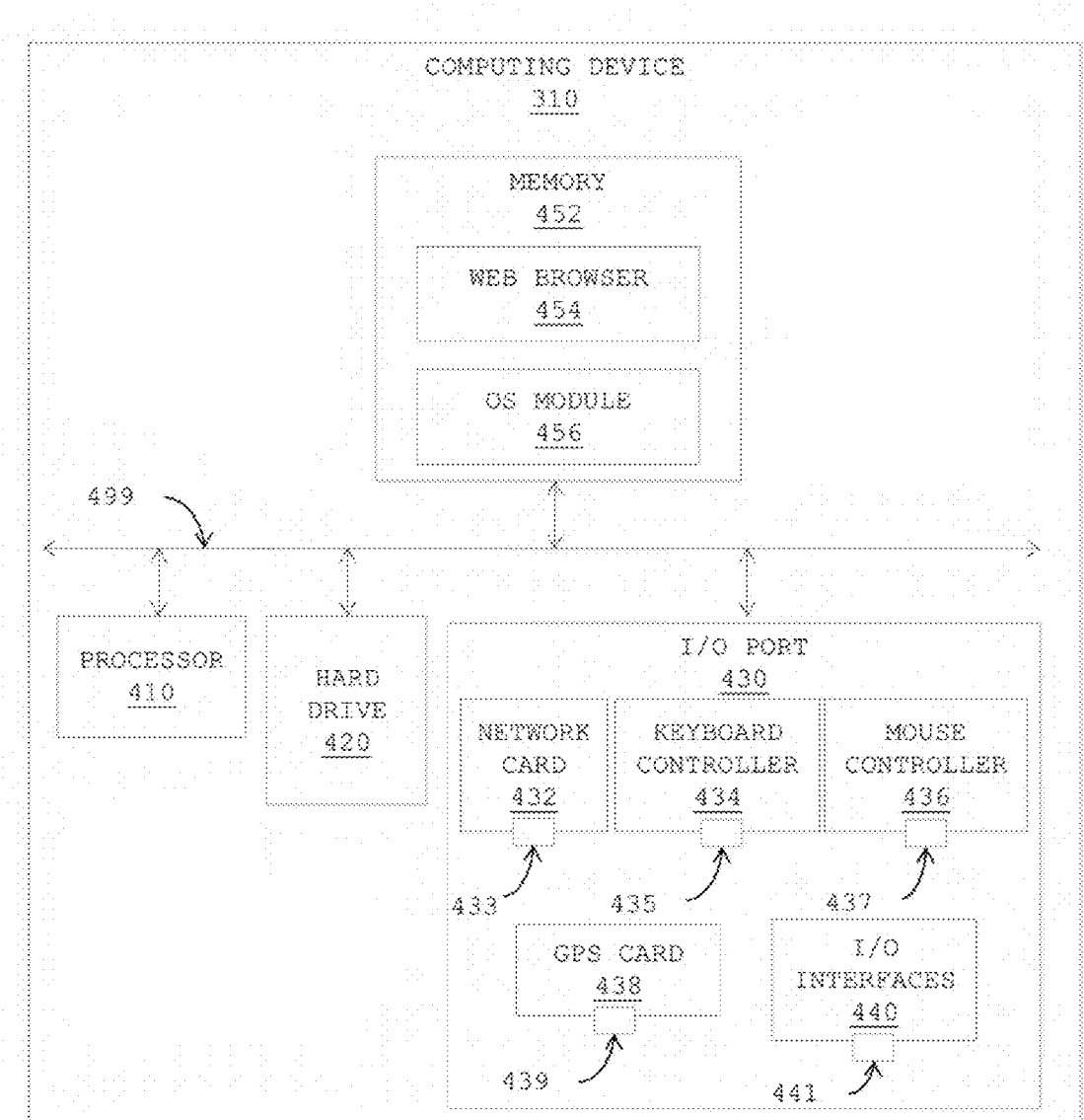
FIG. 4 is a block diagram illustrating an exemplary computing device, in accordance with one embodiment.

FIG. 4 is a block diagram illustrating an exemplary computing device, for example the computing device 310 in accordance with one embodiment. The computing device 310 includes a processor 410, a hard drive 420, an I/O port 430, and a memory 452, coupled by a bus 499.

The bus 499 can be soldered to one or more motherboards. Examples of the processor 410 includes, but is not limited to, a general purpose processor, an application-specific integrated circuit (ASIC), an FPGA (Field Programmable Gate Array), a RISC (Reduced Instruction Set Controller) processor, or an integrated circuit. The processor 410 can be a single core or a multiple core processor. In one embodiment, the processor 410 is specially suited for processing demands of location-aware reminders (for example, custom micro-code, and instruction fetching, pipelining or cache sizes). The processor 410 can be disposed on silicon or any other suitable material. In operation, the processor 410 can receive and execute instructions and data stored in the memory 452 or the hard drive 420. The hard drive 420 can be a platter-based storage device, a flash drive, an external drive, a persistent memory device, or other types of memory.

The hard drive 420 provides persistent (long term) storage for instructions and data. The I/O port 430 is an input/output panel including a network card 432 with an interface 433 along with a keyboard controller 434, a mouse controller 436, a GPS card 338 and I/O interfaces 440. The network card 432 can be, for example, a wired networking card (for example, a USB card, or an IEEE 802.3 card), a wireless networking card (for example, an IEEE 802.11 card, or a Bluetooth card), and a cellular networking card (for example, a 3G card). The interface 433 is configured according to networking compatibility. For example, a wired networking card includes a physical port to plug in a cord, and a wireless networking card includes an antennae. The network card 432 provides access to a communication channel on a network. The keyboard controller 434 can be coupled to a physical port 435 (for example PS/2 or USB port) for connecting a keyboard. The keyboard can be a standard alphanumeric keyboard with 101 or 104 keys (including, but not limited to, alphabetic, numerical and punctuation keys, a space bar, modifier keys), a laptop or notebook keyboard, a thumb-sized keyboard, a virtual keyboard, or the like. The mouse controller 436 can also be coupled to a physical port 437 (for example, mouse or USB port). The GPS card 438 provides communication to GPS satellites operating in space to receive location data. An antenna 439 provides radio communications (or alternatively, a data port can receive location information from a peripheral device). The I/O interfaces 440 are web interfaces and are coupled to a physical port 441.

The memory 452 can be a RAM (Random Access Memory), a flash memory, a non-persistent memory device, or other devices capable of storing program instructions being executed. The memory 452 comprises an Operating System (OS) module 456 along with a web browser 454. In other embodiments, the memory 452 comprises a calendar application that manages a plurality of appointments. The OS module 456 can be one of Microsoft Windows® family of operating systems (for example, Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

The web browser 454 can be a desktop web browser (for example, Internet Explorer, Mozilla, or Chrome), a mobile browser, or a web viewer built integrated into an application program. In an embodiment, a user accesses a system on the World Wide Web (WWW) through a network such as the Internet. The web browser 454 is used to download the web pages or other content in various formats including HTML, XML, text, PDF, postscript, python and PHP and may be used to upload information to other parts of the system. The web browser may use URLs (Uniform Resource Locators) to identify resources on the web and HTTP (Hypertext Transfer Protocol) in transferring files to the web.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 1802.11n). In one example, signals from the computer can be transferred, at least in part, wirelessly to components or other computers.

Advantageously, the method ensures that the user does not miss the digital video when the user changes attentions. Moreover, the method prevents the user from neglecting the advertisement.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method comprising:
    with a computing device, playing an advertisement while displaying a first webpage, wherein playing the advertisement while displaying the first webpage comprises playing the advertisement while displaying a first application;
    pausing, with the computing device, the playing of the advertisement in response to detecting an opening of a second webpage, wherein the second webpage and the first webpage are generated from different applications; and
    after pausing the playing of the advertisement, displaying, with the computing device, the paused advertisement with the second webpage, wherein displaying the paused advertisement with the second webpage comprises displaying the advertisement with a second application in the second webpage.

2. The method of claim 1, wherein displaying the advertisement with the second webpage comprises resuming, with the computing device, the playing of the paused advertisement.

3. The method of claim 2, wherein the resuming of the playing of the paused advertisement starts upon receiving a user input to unpause the advertisement.

4. The method of claim 2, further comprising:
    tracking, with a system clock, a time of pausing upon pausing the advertisement,
    wherein resuming the playing of the paused advertisement is based on tracking the time of pausing with the system clock.

5. The method of claim 1, wherein displaying the first webpage comprises displaying, with the computing device, the first webpage in a first browser tab, and
    wherein displaying the paused advertisement with the second webpage comprises displaying, with the computing device, the advertisement with the second webpage in a second browser tab.

6. The method of claim 1, wherein displaying the advertisement with the second webpage comprises displaying, with the computing device, the paused advertisement in a corner of the second webpage.

7. The method of claim 1, wherein playing the advertisement while displaying the first webpage comprises begin playing, with the computing device, the advertisement when a video begins playing on the first webpage.

8. A non-transitory computer-readable storage medium storing instructions executable by a processor, wherein the instructions comprise:
    instructions that, when executed by the processor, are configured to play an advertisement in a first webpage being displayed, wherein playing the advertisement while displaying the first webpage comprises playing the advertisement while displaying a first application;
    instructions that, when executed by the processor, are configured to pause the playing of the advertisement in response to detecting an opening of a second webpage, wherein the second webpage and the first webpage are generated from different applications; and
    instructions that, when executed by the processor, are configured to display the paused advertisement in the second webpage upon detecting the opening of the second webpage, wherein displaying the paused advertisement with the second webpage comprises displaying the advertisement with a second application in the second webpage.

9. The non-transitory computer-readable storage medium of claim 8, wherein the instructions configured to display the advertisement in the second webpage comprise instructions that, when executed by the processor, are configured to display a snapshot of the paused advertisement in the second webpage.

10. The non-transitory computer-readable storage medium of claim 9, wherein the instructions further comprise instructions that, when executed by the processor, are configured to resume the playing of the paused advertisement in the second webpage from a time corresponding to the snapshot.

11. The non-transitory computer-readable storage medium of claim 10, wherein the instructions configured to resume the playing of the advertisement comprise instructions that, when executed by the processor, are configured to resume the playing of the paused advertisement in response to a user input to unpause the advertisement.

12. The non-transitory computer-readable storage medium of claim 8, wherein the instructions configured to display the paused advertisement in the second webpage comprise instructions that, when executed by the processor, are configured to display the advertisement in a corner of the second webpage.

13. A computing device comprising:
  memory storing a web browser, and
  processor circuitry in communication with the memory, the processor circuitry configured to:
    load a first webpage using the web browser;
    play an advertisement in the loaded first webpage, wherein playing the advertisement in the loaded first webpage comprises playing the advertisement while displaying a first application;
    load a second webpage using the web browser after the first web page is loaded;
    pause the playing of the advertisement in response to the loading of the second web page, wherein the second webpage and the first webpage are generated from different applications; and
    display the paused advertisement in the second webpage, wherein displaying the paused advertisement with the second webpage comprises displaying the advertisement with a second application in the second webpage.

14. The computing device of claim 13, wherein the processor circuitry is further configured to:
  create a snapshot of the paused advertisement when pausing the advertisement; and
  display the snapshot in the second webpage.

15. The computing device of claim 13, wherein the processor circuitry is further configured to resume play of the paused advertisement in the second webpage from a time corresponding to a pause of the advertisement.

16. The computing device of claim 13, wherein the processor is configured to:
  load the first webpage in a first browser tab of the web browser;
  load the second webpage in a second browser tab of the web browser; and
  display the paused advertisement in the second webpage loaded in the second browser tab.

17. The computing device of claim 13, wherein the processor circuitry is configured to display the paused advertisement in a corner of the second webpage.

* * * * *